United States Patent

[11] 3,631,893

[72] Inventors Wendell L. Seaman
Allen, Tex.;
William A. Etter, Marshalltown, Iowa
[21] Appl. No. 821,242
[22] Filed May 2, 1969
[45] Patented Jan. 4, 1972
[73] Assignee Fisher Controls Company, Inc.
Marshalltown, Iowa

[54] SAFETY CONTROL VALVE
2 Claims, 8 Drawing Figs.
[52] U.S. Cl..................................................... 137/630,
137/517, 137/599.2, 251/259
[51] Int. Cl....................................................... F16k 17/30
[50] Field of Search............................................ 137/71,
498, 517, 599.2, 629, 630, 630.14, 320, 322;
251/259

[56] References Cited
UNITED STATES PATENTS
299,669   6/1884   Montgomery.................. 251/259
1,028,682   6/1912   Creighton et al. ............. 251/259 X
2,765,801   10/1956   Selim............................. 137/71
2,834,377   5/1958   Bragg............................ 137/630.14
3,032,067   5/1962   Johnson et al. ................ 137/630
3,095,899   7/1963   Billington...................... 137/630 X
3,469,605   9/1969   Courtot et al.................. 137/630

Primary Examiner—M. Cary Nelson
Assistant Examiner—Richard Gerard
Attorney—Molinare, Allegretti, Newitt & Witcoff ABSTRACT: A safety control valve to be disposed on a tank for loading and unloading liquefied gas therefrom. The safety control valve includes a valve body having a valve seat at an end thereof within the tank and a main valve plug cooperating therewith. A pilot valve plug slidably carries the main valve plug. An operator actuates the pilot valve plug to bleed pressure from the tank and permit opening of the main valve plug. The main valve plug will close if there is excess flow above a predetermined value, due, for example, to a break in the pipeline downstream of the valve.

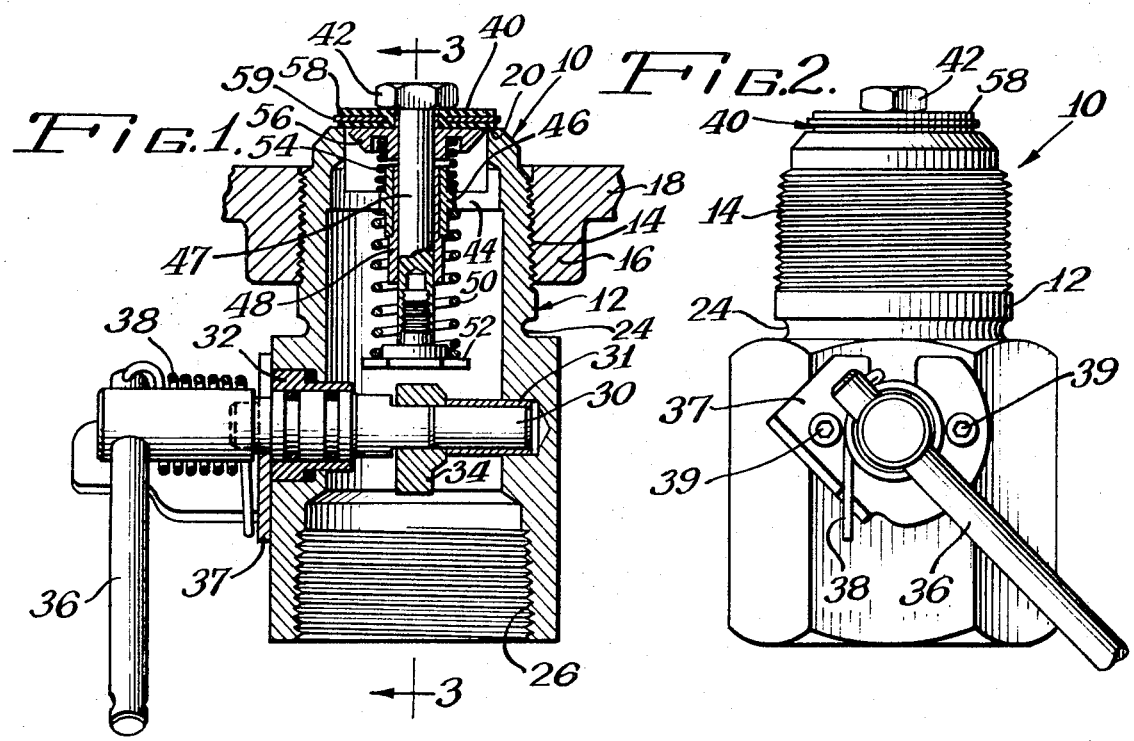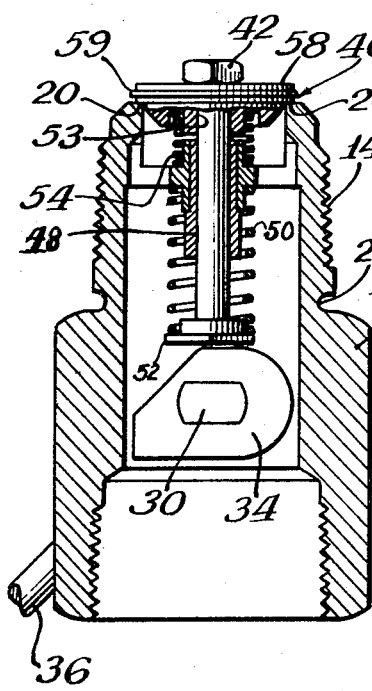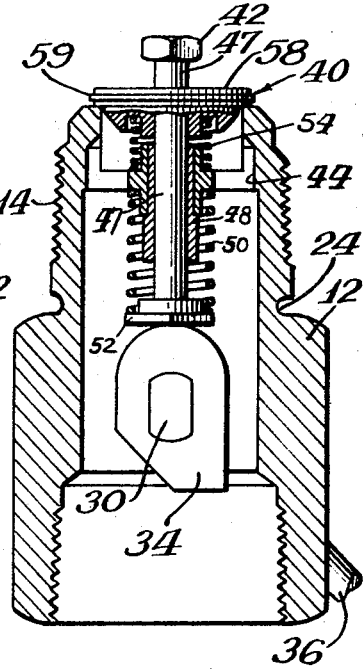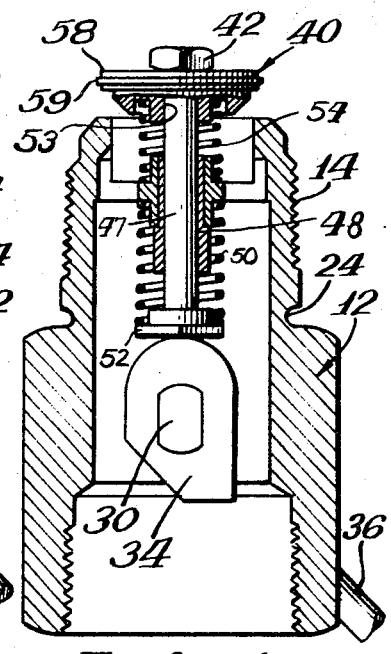
Inventors:
Wendell L. Seaman
William A. Etter
By Bair, Freeman & Molinare Attys.

Inventors:
Wendle L. Seaman
William R. Etter

By

Attys.

SAFETY CONTROL VALVE

BACKGROUND OF THE INVENTION

This invention relates to a safety control valve and, more particularly, to a safety control valve utilized to control the flow of a liquefied gas or vapor during loading and unloading of a tank for containing such gas.

Liquefied petroleum gas or anhydrous ammonia or like liquefied gas can present a danger in the event it should escape from a tank during filling or unloading operations. Liquefied petroleum gas is combustible and anyhydrous ammonia is toxic and presents a danger to persons in the immediate area. Valves utilized to fill and empty such tanks have been provided with features for assuring closure of the valve in the event a line should fracture for one reason or another. Such valves for tanks of the transport or stationary type have generally been relatively complex in order to provide the desired safety.

An object of the present invention is to provide an improved simplified safety control valve structure which provides for economies in manufacture and installation.

Another object of the present invention is to provide an improved safety control valve incorporating a main valve plug and a pilot valve plug, both valve plugs closing in the event the valve body itself is accidentally broken off at a specially designed breakoff section outside of the retaining means holding the valve body on a tank.

Still another object of this invention is to provide an improved control valve for controlling flow of liquefied gas during tank filling and unloading, such valve including a main valve plug and a pilot valve plug, with cam actuating means for moving the pilot valve plug to permit bleed of pressure from the tank so as to permit opening of the main valve plug by its associated spring.

Another object of the invention is to provide an improved safety control valve incorporating a main valve plug slidable on a pilot valve plug, the main valve plug being biased open and being closed if there is excess flow above a predetermined value from the tank.

Yet another object of this invention is to provide an improved safety control valve incorporating a side flange having an opening of sufficient size to permit a complete operating cam to be removed therethrough so as to obviate the necessity for disassembling the piping associated with the valve in order to repair or replace the operating cam.

Other objects and advantages of the present invention will become more apparent hereinafter.

BRIEF DESCRIPTION OF THE DRAWING

There is illustrated in the attached drawing presently preferred embodiments of the present invention, wherein:

FIG. 1 is a longitudinal cross-sectional view of a safety control valve embodying principles of the present invention;

FIG. 2 is a elevational view of the safety control valve of FIG. 1;

FIG. 3 is a cross-sectional view of the safety control valve of FIG. 1 taken generally along the line 3 — 3, and illustrating the main valve plug in the closed position;

FIG. 4 is a cross-sectional view similar to FIG. 3, illustrating the pilot valve plug open;

FIG. 5 is a view similar to FIG. 3, illustrating the main valve plug open;

DETAILED DESCRIPTION OF THE PREFERRED EMBODIMENTS OF THE PRESENT INVENTION

Figure 6:
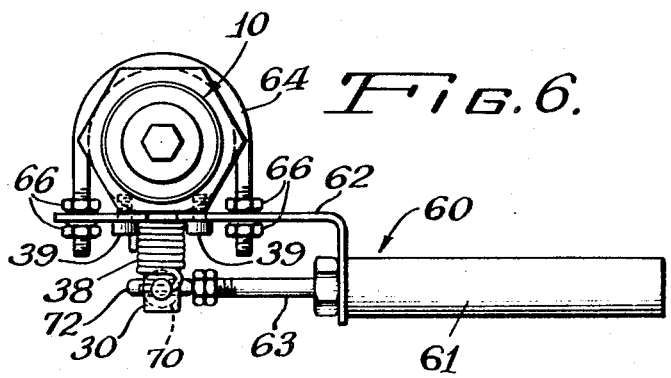
FIG. 6 is a plan view of a cylinder actuator for operating the cam within the safety control valve.

Referring now to FIGS. 1 and 2, there is illustrated a safety control valve 10 embodying the present invention. The safety control valve 10 includes a valve body 12 having an upper portion threaded as indicated at 14 for engagement with an internally threaded coupling or flange 16 of the tank or container 18. Though a threaded connection is shown between the valve body 12 and the tank 18, it is apparent that a flanged connection can be utilized if desired. The upper end of the valve body 12 has a valve seat 20 formed thereon and extends into the tank 18, with the lower end of the valve body 12 extending downwardly from the tank 18. Below the point of connection of the valve body 12 to the coupling or flange 16 of tank 18 is a specially reduced section defined by an annular recess 24 which is for the purpose of providing a weakened section so that in the event the valve body 12 receives a sharp blow or is forcibly bent, it will break at the recess 24 rather than at some other place. As will be explained more fully hereafter, the valve plugs within the valve body 12 will automatically close to prevent escape of gas from the tank 18 in the event that the valve body is damaged in this manner.

The valve body 12 is generally of a tubular configuration and includes an internally threaded portion 26 at the lower end thereof for receiving a conduit adapted to be communicated to a point of use.

Journaled within the valve body 12 and extending transversely to the longitudinal axis thereof is a shaft member 30 which is adapted to be journaled at one end within a bearing 31 and at the other end within a bearing 32. Carried on the axle or shaft 30 is an operating cam 34 for cooperating with and actuating the valve means in the valve body. An operating handle 36 is connected to the shaft 30 for actuating same and a torsion spring 38 may be provided to rotate the shaft 30 in a predetermined direction to permit closure of the valve means, as will be made more apparent hereinafter. Bracket 37 is secured to the valve body 12 by suitable fastening means, for example, bolts 39 for retaining bearing 32 in place. In addition, bracket 37 includes an outwardly turned lug for retaining an end of the torsion spring 38. The other end of spring 38 engages with the operating handle 36.

The valve means provided within the valve body 12 for controlling the flow of fluid from the tank 18 include a main valve plug 40 adapted to cooperate with the valve seat 20 on the end of the valve body 12 and a pilot valve plug 42 which slidably receives the main valve plug 40 thereon.

Formed in the valve body 12 are a plurality of holes 44 defining a central hub portion 46. If desired, a spider having a central hub can be employed, for example, where the valve body is a casting. Fixedly received within the hub portion 46 is a sleeve or guide 48 which slidably receives and guides the stem 47 of the pilot valve plug 42. A valve spring 50 acts between the central hub portion 46 and a wide-headed bolt 52 on the bottom of the pilot valve stem 47 for biasing the pilot valve plug 42 closed against the top of the main valve plug 40. A valve spring 54 is disposed between the hub 46 and the bottom of the main valve plug 40 for biasing the main valve plug 40 open.

The main valve plug 40 includes a base portion 56 having a resilient seal 58 carried on the upper end thereof. As seen in FIG. 1, the resilient seal 58 has an annular resilient portion generally U-shaped in cross section made from synthetic rubber or like material and a washer 59 retained in the U-shaped cross section of the seal for rigidifying the seal. The resilient seal or member 58 functions both as a valve seat and a valve head. It includes a lower valve head portion that cooperates with valve seat 20 and an upper seat portion that cooperates with valve head 42.

Referring now to FIGS. 3, 4 and 5, the operation of the safety control valve embodying the present invention will be described. In the normal closed position of the safety control valve 10, as seen in FIG. 3, the main valve plug 40 is seated against the valve seat 20 at the upper end of the valve body 12. The operating lever 36 is in the closed position and tank pressure which may be either liquid or vapor is unable to register in the downstream system and bubbletight shutoff of the main valve plug 40 against its seat 20 is assured.

By moving the operating lever 36 as shown in FIG. 4, the shaft 30 and the operating cam 34 operatively connected thereto are rotated so as to force the pilot valve stem 47 upwardly, opening the pilot valve orifice means 53 which is defined between the exterior of the pilot valve stem 47 and the interior of the opening through the base 56 of the main valve plug 40. Tank pressure from within the tank 18 is able to bleed through the orifice or opening 53 between the pilot valve stem 47 and the valve plug 40 and builds up downstream pressure below the seated main valve plug 40. When downstream pressure approaches tank pressure, the spring 54 opens the main valve 40 (FIG. 5). The system is ready for transfer operation with the main valve 40 acting as an excess flow valve in the event the flow exceeds a predetermined amount.

Upon release of the operating lever 36 from the position shown in FIGS. 4 and 5, it will be immediately returned to the position shown in FIG. 3 by the spring 38, with the result that the cam 34 will no longer hold the pilot valve stem 47 up and the spring 50 will bias the pilot valve stem 47 downwardly, closing both the main valve plug 40 and the pilot valve plug 42.

Figure 7:
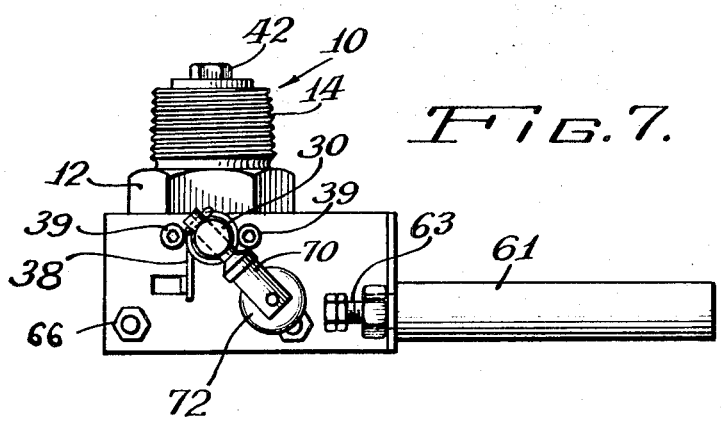
FIG. 7 is an elevational view of the cylinder actuator of FIG. 6.

Turning now to FIGS. 6 and 7, there is illustrated a safety control valve 10 of the present invention provided with a cylinder actuator 60. The cylinder actuator 60 includes a bracket 62 secured to the valve 10 by means including bolts 39 and by a U-clamp 64 and associated nuts 66. The bracket 62 is generally in the form of an angle member having a U-bolt 64 affixed to one arm thereof and the cylinder 61 affixed to the other arm thereof. The cylinder rod 63 is adapted to move between the extended position illustrated in FIG. 6 and the retracted position illustrated in FIG. 7. The spring 38 disposed about the shaft 30 is adapted to bias same to the position shown in FIG. 7, so as to permit closure of the valve means in the valve 10. The rod 63 of the cylinder actuator 61 will move the operating lever 70 in opposition to the bias of the spring 38 to open the valve means in valve 10. The operating lever 70 is secured at its upper end to the shaft 30. The lower end of lever 70 is in the form of a yoke having a roller 72 journaled therein. The outer end of the cylinder rod 63 is adapted to engage the roller 72 in order to actuate and rotate the shaft 30 and the operating cam 34 secured thereto for actuating the valve means in valve 10 to permit opening of the main valve plug 40.

Figure 8:
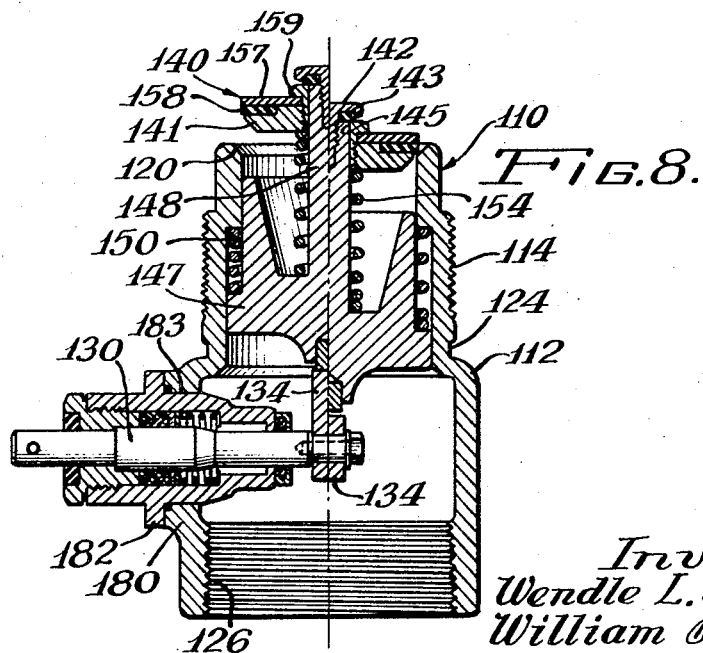
FIG. 8 is a longitudinal cross-sectional view of a modified safety control valve embodying principles of the present invention.

In FIG. 8, there is illustrated a modification of the safety control valve. The valve 110 includes a valve body 112 having a breakoff recess 124 below the threaded connecting portion 114. The right half of the cross-sectional view of the modified safety control valve 112 illustrates the main valve plug 140 in the closed position and the left half illustrates the main valve plug 140 in the open position. The pilot valve plug includes a weblike member 147 which may comprise three webs extending outwardly from a center portion. The outer ends of the webs engage with and slide within the walls of the body 112. The member 147 is biased downwardly by means of the spring 150. Slidably carried on the upper end of the stem portion 148 of the member 147 is the main valve plug 140 which is comprised of a ringlike base member 141, an upper washerlike member 157, a resilient seat member on seal 158 made from synthetic rubber or the like material, and washer ring 159. The seat member or seal 158 is retained between the base 141 that is threaded to the washer ring 159 and the member 157. The main valve plug 140 is adapted to cooperate with a seat 120 formed on the upper end of the body 112. The pilot valve 142 is provided with a resilient seat 143 which is adapted to engage the top of washer ring 159. A flow passage is provided communicating the space below the main valve plug 140 with the interior of the tank with which the valve is used through the annular space 145 between the upright or stem portion of member 147 and the interior of the annular washer ring 159.

The passage defined between the members 159 and 147 is closed by the annular seat 143 which seats against the top of member 159.

The operation of the device illustrated in FIG. 8 is like that of the device illustrated in FIGS. 1 and 2. Initially, the cam 134 is in the position shown on the right side of FIG. 8 and the main valve plug 140 is seated against the seat 120. Rotation of the shaft or axle 130 causes rotation of the cam 134 to the position shown on the left side of FIG. 8. Member 147 will be raised against the bias of its spring 150, separating the pilot valve 142 from its seat against the head of the member 159, opening the passage 145 and permitting tank pressure to bleed through the passage 145 and build up downstream of the main valve plug 140. When downstream pressure approaches and begins to equalize with tank pressure, the excess flow spring 154 will fully open the main valve plug 140 as illustrated on the left side of FIG. 8 and the system is now ready for transfer operation with the main valve 140 acting as an excess flow valve. With the valve means open in valve 110, controlled removal of liquid or vapor from the tank or container at a predetermined rate of flow is allowed. In use, in the event tank pressure exceeds downstream pressure by a predetermined amount, the main valve 140, which is slidable with respect to the stem of the member 147 will close. Rotation of the shaft 130 to the position shown in the right of FIG. 8 will permit closure of both the main valve 140 and the pilot valve 142.

Another advantage of the device of FIG. 8 is that the side flange 180 carries within it a stuffing box assembly 182 within which is disposed the shaft 130. For purposes of repair or replacement, the stuffing box assembly 182 may be readily removed through the opening 183 in the side flange 180, permitting removal of the cam 134 therewith. The opening 183 is of sufficient size to permit removal of the operating cam 134 without disassembly of the piping as was sometimes necessary in past devices of this type. This is accomplished by pulling the stuffing box assembly 182 horizontally from the valve body 112 and then tilting the stuffing box assembly so as to remove the cam 134 from the body. Cam 34 may be similarly removed from valve body 12 by removing bracket 37 and pulling shaft 35 to remove cam 34 through the opening in the valve body (FIG. 1).

The safety control valve of the present invention incorporates a main valve plug which serves both as a primary shutoff of normal flow and as a safety shutoff of excess flow in emergency conditions. The safety control valve is designed so that both the main closing spring and the excess flow spring are downstream of the primary valve body seat. The main closing spring and the excess flow spring are so constructed and arranged that the main closing spring has no effect of spring rate or spring load upon the emergency excess flow spring action. In the modification of FIG. 8, if breakage occurs in the normal external operating linkage, both the pilot valve and the main valve plugs will close due to the fact that the operating cam is off center of the closing force of the main closing spring. This same action will occur in the preferred embodiment of FIGS. 1 and 2 as a result of the operation of the torsion spring 38.

The safety control valves are constructed and arranged so that the main valve will close in the event there is a downstream leak due to breakage in the pipeline, human error or malfunction in the downstream system. In such event, the rate of flow of liquid or vapor from the tank is in excess of a predetermined rate of flow and the main valve plug will be subjected to a pressure drop across it that will overcome the main valve plug spring, thereby causing the main valve plug to close and stopping all flow (except pilot flow) until the malfunction is corrected. Both the main and pilot valve plugs will close automatically, if the valve body itself is accidentally broken off at the breakoff section on the valve body, or if the external operating arm is released or rotated to its original closed position.

The safety control valve of this invention eliminates the need for a cage assembly, resulting in a relatively simple and inexpensive construction. Less complexity results in improved operation with minimum maintenance.

Though a straight through valve body is shown, the invention can be adapted to an angle valve body with one or more outlet openings.

While there has been shown and described presently preferred embodiments of this invention, it will be obvious to those skilled in the art that various changes and modifications may be made therein without departing from the invention and therefore it is intended in the appended claims to cover all such changes and modifications as fall within the true spirit and scope of the invention.

We claim:

1. A safety control valve comprising a unitary valve body adapted to be secured to a tank for pressurized fluid, said valve body having a single chamber defining a flow passage therethrough, valve seat means formed on the upper end of said valve body, support means in said valve body, pilot valve means slidable in said support means, said pilot valve means including a center stem portion, a main valve slidable on said center stem portion of said pilot valve means and cooperating with said valve seat means for closing flow through said flow passage, there being a pilot passage through the main valve between the exterior of the pilot valve means and the interior of the main valve, first spring means between the support means and main valve for biasing the main valve toward open position, second spring means between the support means and pilot valve means for biasing the pilot valve means toward the main valve to close the pilot passage, said spring means both being on the same side with respect to the valve seat means, and cam means in said valve body for actuating said pilot valve means to permit equalization of pressure on opposite sides of said main valve, whereby the first spring means will bias the main valve open, and in the event of a downstream problem and pressure drop, the pressurized fluid will cause the main valve to seat against the valve seat means, said cam means including a shaft carrying a cam member thereon, and spring means for biasing the shaft to enable closure of the pilot valve means by the second spring means, said valve body having an opening therein of sufficient size to receive the shaft and cam member, whereby the cam member can be readily removed from the valve body through said opening for repair or replacement.

2. A safety control valve comprising a unitary valve body adapted to be secured to a tank for pressure fluid, said valve body having a single chamber defining a flow passage therethrough, an upper end portion of said valve body being secured to said tank, valve seat means on said end portion of said valve body, a pilot valve slidable in said valve body and having an upstanding center portion, a main valve slidable on said center portion of said pilot valve and cooperating with said valve seat means for closing flow through said flow passage, there being a pilot passage defined between said center portion of the pilot valve and the main valve, said pilot valve including a head portion seating against said main valve for closing the pilot passage, first spring means about the center portion between the pilot valve and main valve for biasing the main valve toward open position, second spring means between the valve body and pilot valve for biasing the pilot valve to move the head portion against said main valve to close the pilot passage, said spring means both being on the same side with respect to the valve seat means, and cam means in said valve body actuable from outside the valve body for actuating said pilot valve, whereby the cam means moves the pilot valve to compress the second spring means and open the pilot passage to permit equalization of pressure on the upstream and downstream surfaces of the main valve, and upon such equalization of pressure, the first biasing means will open the main valve, said main valve being closed when the pressure drop across it overcomes the force of the first biasing means, said cam means including a shaft carrying a cam member thereon, said valve body having an opening therein of sufficient size to receive the shaft and cam member, whereby the cam member can be readily removed from the valve body through said opening for repair or replacement.

* * * * *